Figure 1:
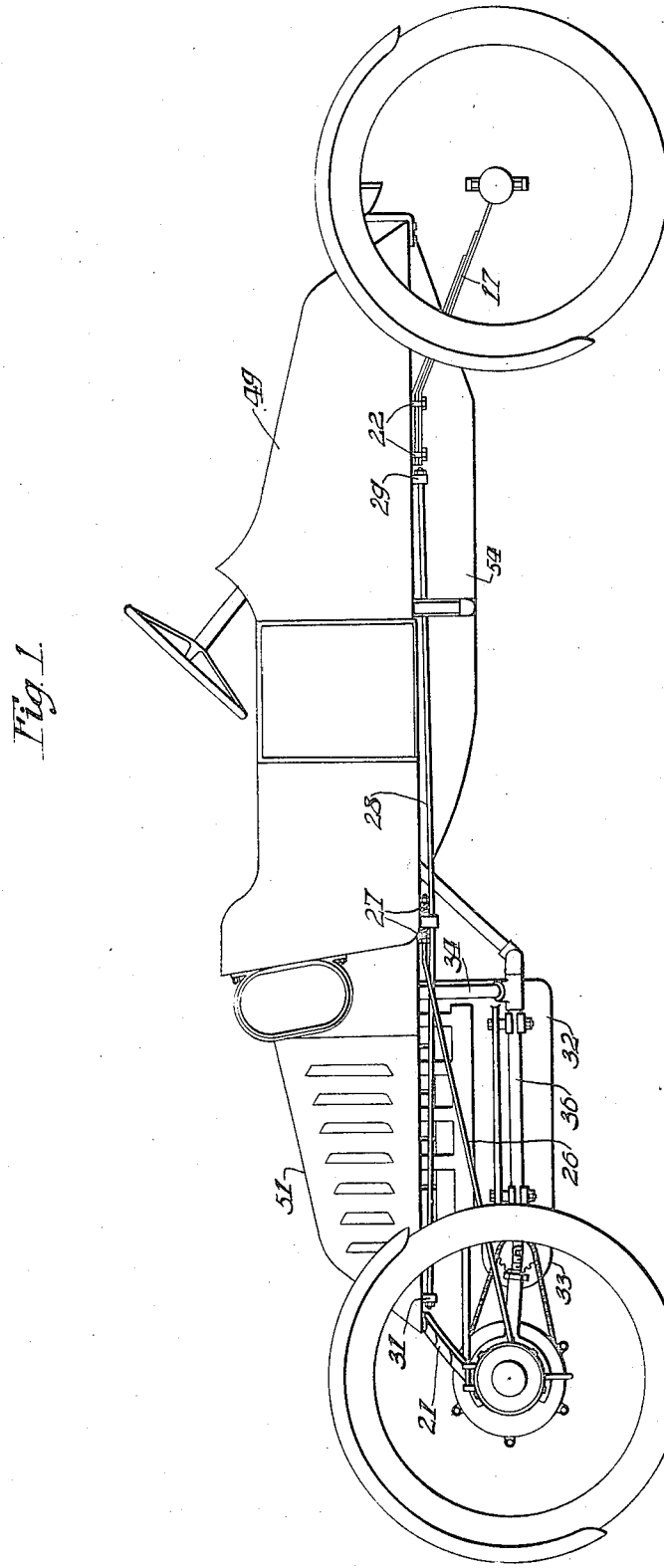

Feb. 19, 1924.

H. E. CROSS

MOTOR CAR

Filed Nov. 29, 1919

1,484,474

4 Sheets-Sheet 3

Harry E. Cross Inventor

By Ira J. Wilson

Atty.

Feb. 19, 1924.
H. E. CROSS
MOTOR CAR
Filed Nov. 29, 1919   4 Sheets-Sheet 4
1,484,474
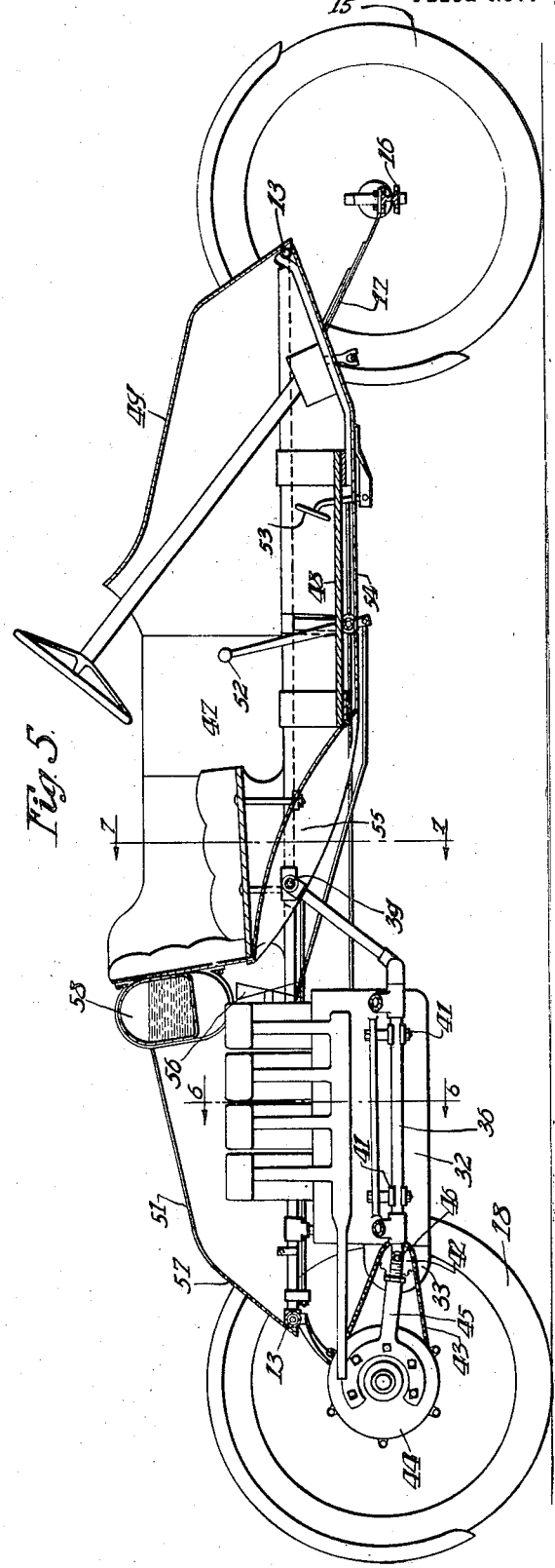
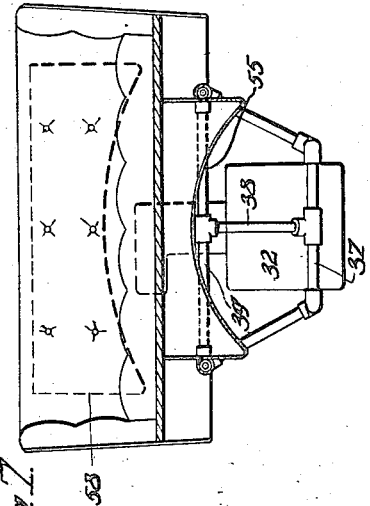
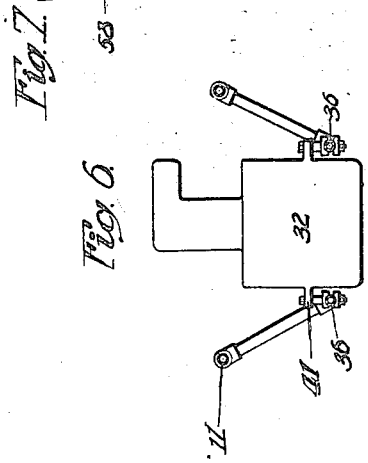
Inventor
Harry E. Cross
By Ira J. Wilson
Atty.

Patented Feb. 19, 1924.

1,484,474

UNITED STATES PATENT OFFICE.

HARRY E. CROSS, OF ROCKTON, ILLINOIS.

MOTOR CAR.

REISSUED

Application filed November 29, 1919. Serial No. 341,493.

*To all whom it may concern:*

Be it known that I, HARRY E. CROSS, a citizen of the United States, residing at Rockton, in the county of Winnebago and State of Illinois, have invented certain new and useful Improvements in Motor Cars, of which the following is a specification.

This invention pertaining in general to motor vehicles, has more particular reference to those of the pleasure-car type as distinguished from trucks and other essentially commercial vehicles.

It is proposed by this invention to fill the demand in the pleasure car field, for a car considerably lighter than the recognized standard light car, but of the same wheel gage and substantially the same wheel base thereof, and which shall have excellent riding qualities and be especially economical to maintain and operate. That is, this invention contemplates a car of about one-half the weight of the ordinary light car now on the market and yet one not of the character of the so-called "freak" cars having narrow gage and other undesirable features, making them unsafe to operate over country roads or any rough roads and uncomfortable to ride in.

The small car builder has heretofore followed regular and standardized automobile construction and design, which is inimical to the production of a practical car of the light weight contemplated by this invention; while on the other hand, very light motor vehicles have been produced and marketed, either of the "buck-board" or narrow gage cycle type. It is the aim of the present invention to provide a car different and distinguished from either of these types, that is, materially lighter than the ordinary light car, and yet possessing none of the disadvantages and undesirable features of the buck-board and narrow gage cars.

These general objects are obtained by the coordination of various novel features of construction and arrangement. Primarily, I employ a unique frame construction characterized by its tubular formation and support of the motor unit close to the rear end of the vehicle and low down. In other words, I support the motor on a sub-frame, preferably of tubular construction, so as to bring the center of gravity quite low and also to eliminate, by proximity of the motor to the rear axle, considerable driving parts and weight necessitated by placing the motor at the front of the vehicle. This arrangement and the tubular frame structure permit of exceptional lightness, and at the same time enhance rather than detract from good riding qualities and safety, as will be appreciated hereinafter.

As further promoting lightness, safety and comfort, I have arranged the driver's and occupant's seat and foot compartment in front of the motor and relatively low, the flooring of the foot compartment being substantially below the main frame, with the seat in proximity to the level of the frame and preferably slightly above the same. This further lowers the center of gravity, with the attendant advantages in a vehicle of this kind, and also enables a natural and convenient sitting posture. And by extending the control compartment forwardly well under the front hood (which is utilized mainly to cover this compartment and inclose the steering apparatus), ample room is provided for control levers, permitting free and easy operation thereof.

My invention also contemplates special provision for cooling the motor, which in keeping with the general plan of light weight, is air-cooled. I have, therefore, so shaped the bottom of the car as to provide an air channel, whereby a current of air will be induced, especially while the car is in motion, upwardly and rearwardly to the cylinder head.

Further objects reside in features of the frame and sub-frame construction, trussing of the frame, the compact arrangement and connection between the motor-transmission unit and the rear driving axle, and arrangement of springs.

Other objects and attendant advantages will be appreciated as the invention becomes better understood by reference to the following description when considered in connection with the accompanying drawings, in which—

Figure 2:
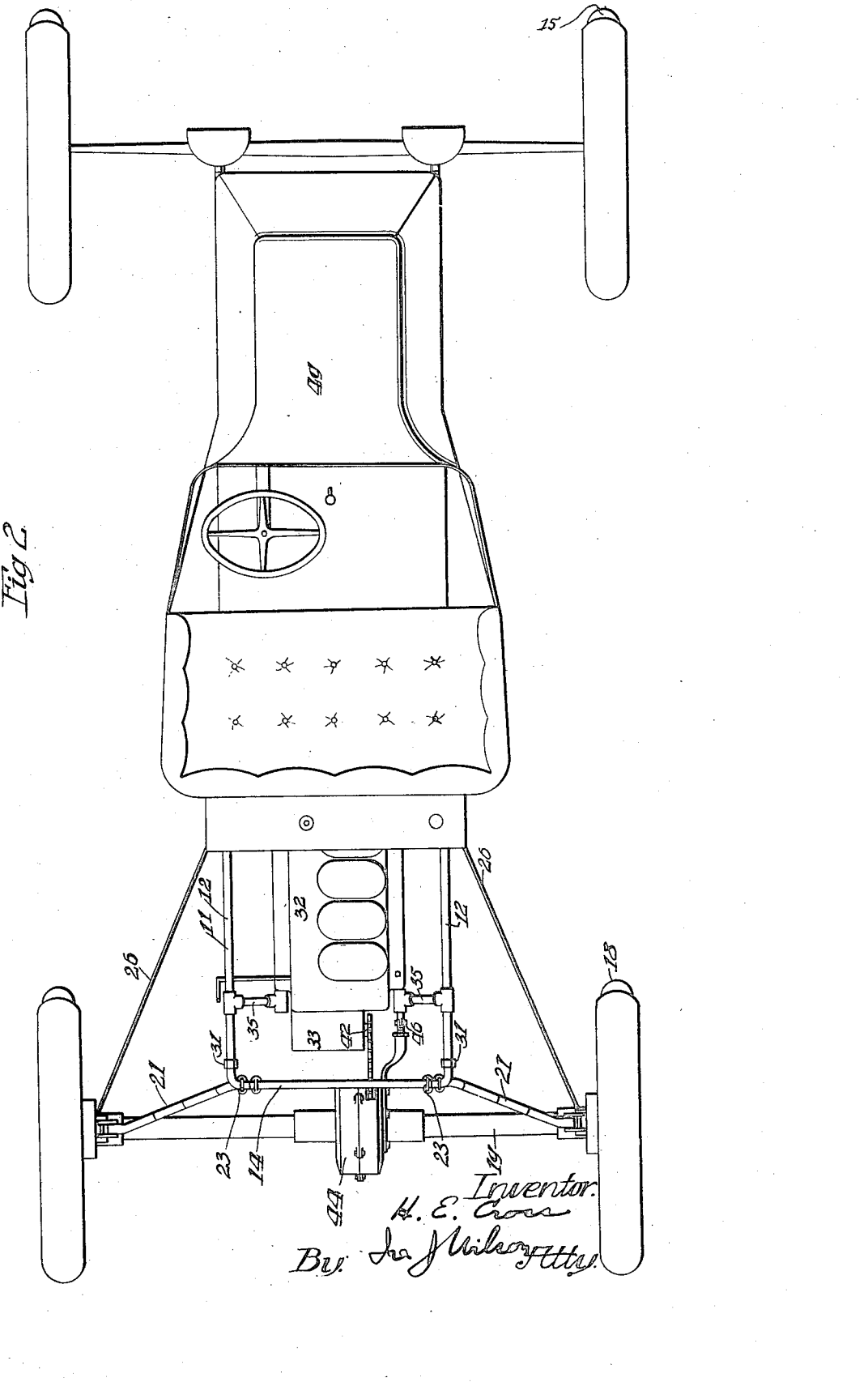
Figure 3:
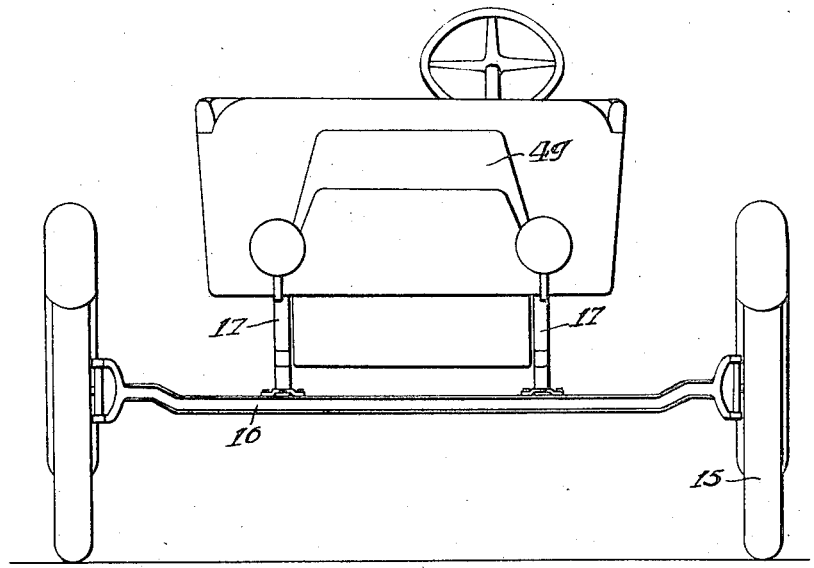
Figure 4:
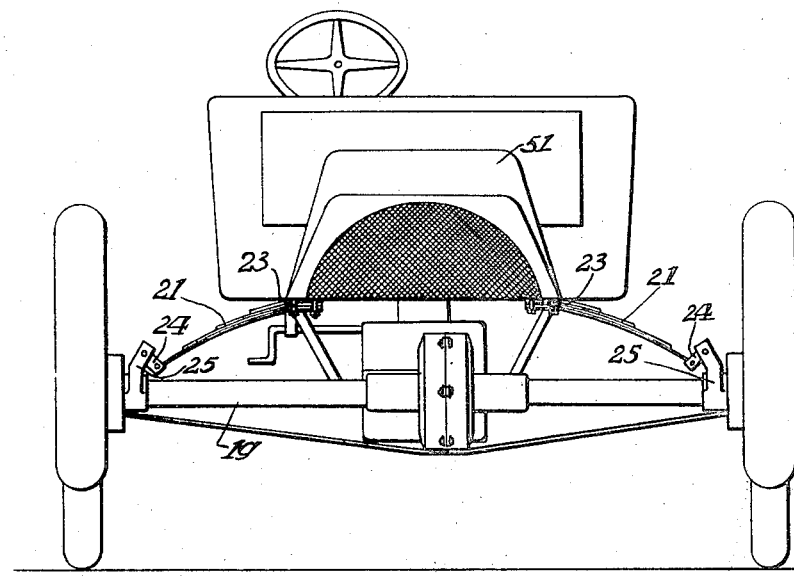

Figure 1 is a side elevation of a motor vehicle embodying my improvements;

Fig. 2, a plan view of the vehicle with the rear hood removed;

Figs. 3 and 4, front and rear views respectively of the vehicle;

Fig. 5, a longitudinal sectional view through the car; and

Figs. 6 and 7, sectional views taken substantially on the lines 6—6 and 7—7 respectively, of Fig. 5.

In order to secure a better understanding of the present invention and an appreciation of the advantages thereof, it should be borne in mind that I am not following what is recognized today as standard automobile construction, as regards both design and arrangement of parts. This does not mean, however, that all of the parts per se are of novel construction, since I employ a motor and transmission unit of any suitable construction in keeping with the invention, and the steering and driving wheels, their axles and appurtenant parts, including the steering mechanism and differential and other features of like import, may be of suitable construction.

It will be noted viewing Figs. 1 and 2, that I have provided a motor car having standard wheel gage and relatively long wheel base considering the size and weight of the car, also that the frame is comparatively narrow and designed preferably to accommodate two people sitting abreast. In this regard, it might be mentioned that I contemplate meeting the demand for a two-passenger car, such as prevails for a motorcycle with side car attached. That is, the approximate selling price and cost of operation of a car such as provided herein, is substantially the same, but with none of the disadvantages and undesirable features of a motor-cycle and side car, especially as regards appearance, riding qualities and safety. For purpose of lightness, strength and durability, I employ a main frame of tubular construction, and also a tubular sub-frame for supporting a motor and transmission unit at the rear end of the main frame and substantially below the same. The purpose of this arrangement is to secure low center of gravity, to position the motor and transmission unit in close proximity to the rear axle so as to obtain substantially direct driving and minimum number of parts to reduce weight by reason of the motor construction and open frame and yet obtain, by location of the motor unit, adequate weight to insure proper traction of the rear wheels, and for other reasons which will be appreciated by those familiar with this art. The main frame designated generally by character 11, is formed of longitudinal side members 12 joined by front and rear cross members 13 and 14, respectively. This relatively long, narrow rectangular frame is supported at its front end by steering wheels 15 through the agency of an axle 16 and springs 17 and at its rear end by driving wheels 18 through means of an axle housing 19 and springs designated generally by character 21. The wheels, axles and casing may be of any suitable construction, but the spring arrangement is particularly novel and advantageous. The front springs 17 are half sweeps of semi-elliptic springs rigidly attached by means of U-bolts 22 to the frame members 12, at the rear of the front frame member 13 and extending forwardly and downwardly therefrom, as shown. The rear springs, also preferably in the form of half sweeps of semi-elliptic springs, are arranged crosswise of the car, being attached at their inner ends by suitable means such as U-bolts 23, to the rear frame member 14 and extending outwardly therefrom and pivotally connected at their outer ends to suspension hangers 24, carried by brackets 25, loosely mounted on the axle casing 19. It will be particularly noted, viewing Fig. 2, that the rear axle is spaced rearwardly of the frame member 14 and that the springs 21 are inclined rearwardly by reason of this wide span rear spring arrangement and of the rearwardly inclined arrangement of the rear springs, exceptional riding qualities are obtained, because maximum flexibility is afforded, and special provision is made for this in the arrangement of the driving connection between the motor and differential. Radius rods 26 connected with the outer ends of the axle housing and at their forward ends with the main frame through the agency of front and rear spring seats 27, as shown in Fig. 1, serve to brace and hold in alignment the rear axle casing and also permit of the desired flexibility by reason of the spring cushion connections 27. In view of the relatively long reach of the frame 11 and of the tubular construction, I have provided a truss rod 28 below each side member 12, connected at its forward and rear ends to parts 29 and 31 respectively, which are secured to the members 12 in close proximity to the springs 17 and 21. It will thus be seen that the unsupported part of the frame between the springs 17 and 21 is substantially reinforced by the truss rods 28 so as to adequately carry the stress and strains incidental to usage.

The motor unit, designated generally by character 32, is of an air-cooled type, illustrated diagrammatically in the present drawings, because any suitable motor might be employed. It is also preferred that the transmission, designated generally by reference character 33, shall be so associated with the motor as to constitute therewith a unit adapted to be supported by the sub-frame mentioned above, substantially below the main frame. The sub-frame in the present instance, consists of front and rear upright tubular members 34 and 35 attached at their upper ends to each side member 12 and inclined downwardly and inwardly and supporting at their lower ends, a longitudinal frame member 36. These sub-frame members 36 are held in spaced relation by means of a front cross member 37, which is turn is braced medially by a forwardly and upwardly inclined member 38 attached at its upper end to the cross member 39 joining the side members 12 medially of the main frame. The motor unit 32 interposed between the sub-frame members 36 and mounted thereon by means of connections 41, also serves to unite into a rigid structure the underhung sub-frame members. The driving member 42 of the change speed transmission is connected by means of a sprocket chain 43, to a sprocket wheel on the driving member of the differential mechanism within the casing 44, the construction of the differential mechanism not being shown, because such devices are well known in the art. A rod or arm 45 fixedly united to the differential casing 44 and pivotally connected at 46, to a part fixed with respect to the sub-frame, serves not only as a radius rod for maintaining the distance between the driving member 43 and the rear axle, but also as a torsion rod, taking the torsional thrust between the differential casing and main frame, resulting from propulsion of the car. A suitable adjustment is provided, preferably in the rod 45 for adjusting the distance between centers of the driving and driven members to take up lost motion resulting from wear and other causes and for properly positioning these parts.

Coming now to the structural features of the body which co-operate with the design and arrangement of the frame and motor, it will be observed, viewing Figs. 1 and 5, that I have further lowered the center of gravity and utilized the space in front of the motor to effect the best riding qualities obtainable in a car of such light weight, and furthermore, to make for comfort and convenience of the occupants. To this end, the occupant's compartment, designated generally by character 47, is disposed in front of the motor, with the seat preferably slightly above the horizontal plane of the main frame and the flooring 48 of the foot compartment substantially below said plane. This low compartment extends forward, giving ample room for the arrangement of foot controls in such position that they may be operated with as much ease and alacrity as in any of the larger cars. That is, in the larger cars the driver's seat is substantially above the floor of the control compartment (which is level with the main frame), so that the driver, in a natural and comfortable sitting posture, may operate the control in free and easy fashion; whereas in those cars having a low center of gravity, such as buckboards and the like, in which the flooring is level with the plane of the main frame, a very unnatural sitting posture is imposed, by reason of the foot control being level with the seat. The low center of gravity resulting from the present arrangement of the occupant's and control compartment and of the motor, is important, especially in view of the standard wheel gage and base and the lightness afforded by reason of the novel features. At this time, it will be observed that the foregoing arrangement permits of a pleasing stream-line body, in which the space is utilized to the best advantage. The lines of the front and rear hoods 49 and 51 may be substantially identical, although the front hood serves to enclose the control and foot compartment and the steering mechanism, and the rear hood the motor-transmission unit. Within the control compartment, I arrange a suitable hand lever 52 for changing speeds, the lever being suitably connected with the change speed transmission 33, which preferably provides three speeds forward and one reverse. Brake and clutch foot levers 53 are also located in said compartment. It will be evident that any suitable control might be employed, according to the type of transmission.

As mentioned above, a feature contributing to light weight, is the use of an air-cooled motor. And because of the position of the motor and the underhung control compartment, which obstructs free air passage to the motor, I have made special provision for insuring an adequate air supply. This is done by shaping the bottom of the body to facilitate and induce an air current to the motor head. Accordingly, the bottom casing 54 of the under body provides a channel 55, Fig. 5, extending upwardly and rearwardly from the floor of the foot compartment substantially to the top of the motor head, and preferably of a concave shape in cross-section, as shown in Fig. 7. When the car is idling, the fan 56 creates an air current for cooling the engine, and when the car is in motion the volume and velocity of this current is materially increased by the air beneath the car being drawn upwardly, not only by the fan but also by reason of the inclined channel bottom 55. The air passage is further facilitated by the provision of a perforated back 57 to the hood 51, and the fuel tank 58 is shaped on its under side, as shown in Figs. 5 and 7, so that it may be positioned low in a suitable location and yet not interfere with the air passage.

From the foregoing, it will be manifest that a distinctly novel motor car is produced; and by reason of the relative arrangement and design of parts, I obtain better riding and road qualities and economies in maintenance and operation than are obtainable with standard light cars of today of approximately twice the weight of the present car.

While I have illustrated but a single practical example of my improvements, it should be understood that the same are susceptible of embodiment in various forms and constructions without departing from the spirit and scope of the invention as expressed in the appended claims, in which—

I claim:

1. In a motor vehicle, the combination of a main frame supported by front steering wheels and rear driving wheels, an operator's seat supported in an intermediate and relatively low position on said frame, a motor rigidly mounted in an underhung position on said frame between the operator's seat and the driving wheels and adapted for driving the latter, and an operator's control and foot compartment, the floor of which is substantially below the main frame.

2. In a motor vehicle of the character described, the combination of a frame supported in part by rear driving wheels, a differential mechanism and casing for said driving wheels, a motor and transmission unit rigidly mounted upon and substantially below said frame in close proximity to said differential casing, a driving chain connecting the differential and driving member of the transmission, and a thrust-connecting rod rigidly secured at its rear end to the differential casing and pivotally connected at its forward end substantially concentric with said transmission driving member to a part fixed with respect to the transmission motor unit, whereby to transmit the propelling thrust and to permit vertical vibration of the driving wheels with respect to the frame.

3. In a motor vehicle of the character described, a rectangular tubular frame supported at its front end by steering wheels and at its rear end by driving wheels of standard gage, a driver's and occupant's seat substantially midway between the ends of the car and in proximity to the horizontal plane of the frame, a foot and control compartment in front of the driver's seat, the flooring of which is substantially below said plane, a tubular sub-frame at the rear of the driver's seat and including longitudinally extending members spaced substantially below said plane, a motor and transmission unit attached to said longitudinal members of the sub-frame and supported by the latter with the transmission unit relatively close to the rear axle, and a flexible driving connection between said transmission unit and rear axle.

4. In a motor vehicle of the character described, a rectangular tubular frame supported at its front end by steering wheels and at its rear end by driving wheels, a driver's seat supported by and intermediate the ends of the frame, a tubular sub-frame at the rear of the driver's seat including longitudinally spaced upright members attached to each longitudinal member of the main frame and extending downwardly and inwardly therefrom and a longitudinal member attached to the lower ends of said upright members at each side of the frame, a motor unit interposed between and mounted on said longitudinal members of the sub-frame so as to be supported thereby substantially below the main frame, and a driving connection between the motor and the driving wheels.

5. In a motor vehicle, the combination of a frame supported by front steering wheels and rear driving wheels, an air-cooled motor unit carried by the frame near the rear end thereof and with its crank axis substantially below the frame, a driver's compartment and seat in front of the motor unit, the bottom of such compartment being substantially below said frame and the rear continuation of said bottom being inclined upwardly and rearwardly beneath the seat into proximity to the top of the motor unit, whereby to form an air channel allowing free passage of air upwardly to the cylinder head.

6. In a motor vehicle, the combination of a frame supported by front steering wheels and rear driving wheels, an air cooled motor unit carried by the frame near the rear end thereof and with its crank axis substantially below the frame, a driver's compartment and seat in front of the motor unit, the bottom of such compartment being substantially below said frame and the rear continuation of said bottom inclined upwardly and rearwardly beneath the seat into proximity to the top of the motor unit, and inclined upwardly and inwardly from the outer sides, whereby to form an air channel for inducing an upward current of air to the cylinder head when the car is in motion.

7. In a motor vehicle, the combination of a frame supported by front steering wheels and rear driving wheels, an air cooled motor unit carried by the frame near the rear end thereof and with its crank axis substantially below the frame, a driver's compartment and seat in front of the motor unit, the bottom of such compartment being substantially below said frame and the rear continuation of said bottom being inclined upwardly and rearwardly beneath the seat into proximity to the top of the motor unit, whereby to form an air channel allowing free passage of air upwardly to the cylinder head, and a rear hood overlying the motor unit and having a perforated rear wall.

8. In a motor vehicle, the combination of a frame supported at its front end by steering wheels and at its rear end by driving wheels of standard gage, spring supports between said wheels and the frame, a body on the frame providing an operator's seat medially between the ends thereof, a foot and control compartment in front of said seat substantially below said frame, an underhung frame portion rigid with respect to the main frame and disposed between said seat and the driving wheels, a motor rigidly mounted on said underhung frame portion, and a driving connection between the motor and rear wheels permitting vertical movement of the latter with respect to the frame.

9. In a motor vehicle, the combination of a wheel-supported frame, a body structure including an operator's seat at a medial position on the frame, an upright motor mounted at a relatively low position on the frame at the rear of the operator's seat, said body structure providing an air channel beneath the operator's seat leading to the motor, and means for inducing a current of air rearwardly through said channel for cooling the motor.

10. In a motor vehicle, the combination of a frame supported by front and rear wheels, a motor mounted at a relatively low position on said frame adjacent to the rear wheels and having driving connection therewith, an operator's seat and a control compartment in front of said motor, means beneath said seat defining an upwardly and rearwardly inclined air channel, and a fan driven by the motor and disposed at the rear portion of said channel for drawing the air rearwardly therethrough.

11. In a motor vehicle of the character described, the combination of a frame supported by front steering wheels and rear driving wheels above the axis thereof, a motor underhung on the rear portion of said frame, an operator's seat forward of the motor, an operator's foot compartment in front of said seat and below the frame, and means permitting a flow of air upwardly and rearwardly to the upper portion of the motor.

12. A motor vehicle of the character described, comprising a frame, front steering wheels and rear driving wheels connected to the frame through the agency of spring supports, an underhung motor-supporting part at the rear portion of the frame, a motor and transmission unit mounted on said motor-supporting part, an axle and differential mechanism connecting the driving wheels, a driving connection between the transmission and differential unit, a thrust-connecting member between the differential casing and transmission, an operator's seat in front of the motor, a foot and control compartment in front of said seat and substantially below the frame, and a front and a rear hood over the foot compartment and motor respectively.

13. In a motor vehicle of the character described, the combination of a wheel-supported frame, an underhung motor supported upon and at the rear portion of the frame, an operator's seat in front of the motor and in a low position on the frame, and a foot and control compartment in front of the seat and substantially below the frame.

14. In a motor vehicle of the character described, the combination of a wheel-supported frame, an upright motor on the rear portion of said frame, a seat-supporting body in front of the motor, means providing a rearwardly and upwardly inclined air channel beneath said seat-supporting body for inducing a flow of air to said motor, and means for artificially stimulating said flow of air for forcing it rearwardly past the motor.

HARRY E. CROSS.